Sept. 2, 1924.

G. O. HEINE 1,507,176

BAGGAGE RECEPTACLE

Filed Dec. 15, 1921

Inventor
GUSTAVE. O. HEINE.

By Lincoln Johnson
Attorney.

Patented Sept. 2, 1924.

1,507,176

UNITED STATES PATENT OFFICE.

GUSTAVE O. HEINE, OF SAN FRANCISCO, CALIFORNIA.

BAGGAGE RECEPTACLE.

Application filed December 15, 1921. Serial No. 522,477.

*To all whom it may concern:*

Be it known that I, GUSTAVE O. HEINE, a citizen of Germany, and a resident of the city and county of San Francisco, State of California, have made a new and useful invention—to wit, Improvements in Baggage Receptacles; and I do hereby declare the following to be a full, clear, concise, and exact description of the same.
This invention relates particularly to baggage receptacles for all types of vehicles.

An object of this invention is to provide a baggage receptacle that may be placed between the frame ends of a vehicle, particularly an automobile, for the purpose of utilizing space that is now wasted.

A further object of my invention is to provide a baggage receptacle that will be superior in point of simplicity and inexpensiveness of construction, facility and convenience in use and general efficiency. A still further object of my invention is to provide a portable baggage receptacle that may be detachably engaged from or engaged with the projecting frame ends of an automobile. Another object of this invention is to provide a combined baggage receptacle, bumper and extensory frame arms to be arranged on vehicles not provided with projecting frame ends. Other objects and advantages will appear as this description progresses.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

Figure 1:
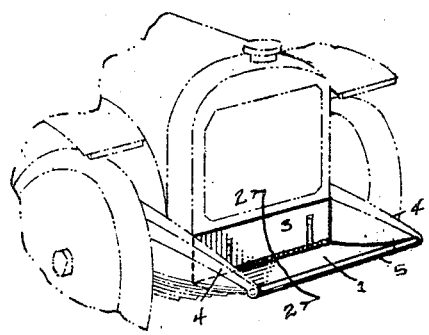
Fig. 1 represents a form of my baggage receptacle applied to the projecting frame ends of an automobile.

In detail the construction illustrated in the drawings, comprises a vehicle of any general or special type but which for the purpose of illustration is preferably an automobile, said automobile being typical of any of the standard makes and types now sold. As a general rule, the ends of the frame of automobiles project beyond the front and rear of the body in such a manner that it has been impossible to utilize the space between the said projecting frame ends. The frame ends projecting beyond the rear of the body of an automobile are made use of in some cases for supporting a gasoline or water tank and for housing specially manufactured trunks and the like.

My invention contemplates utilizing the place between the frame ends, either in the front or rear of the machine, by forming a curved pan or container 1 which would be intercalated between, the sides of the projecting frame ends, the body of the automobile and the termini of said frame ends. In accordance with standard practice, frame ends are curved on a slight radius and the form of the same termed a "goose neck." Springs, interposed between the frames and axle, are at one end connected to the ends of the frame at the opposite end shackled to an intermediate portion of the frame.

Figure 2:
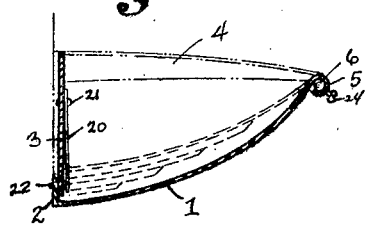
Fig. 2 represents an enlarged sectional view taken through Fig. 1 on the line 2—2.
Figure 3:
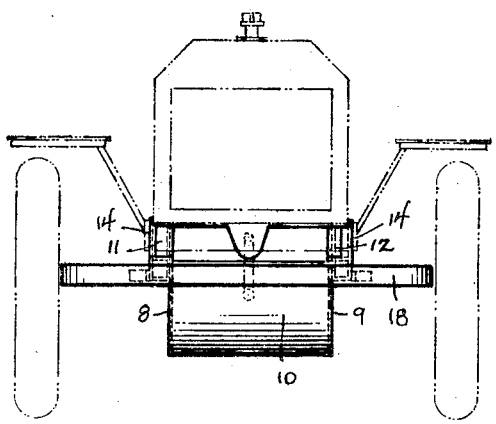
Fig. 3 represents a front elevation of a modified form of baggage receptacle and bumper applied to an automobile.
Figure 4:
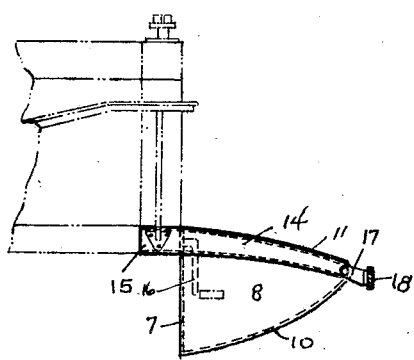
Fig. 4 represents a side elevation of Fig. 3.

The elliptical curvature of the spring and the "goose neck" formation of the frame ends, results in a gap or space between frame and spring which is unsightly and tends to take away from the usual pleasing lines of an automobile. In a measure, the unsightliness of the gap between the frame and spring has been compensated for by securing an apron or similar covering between and depending from the frame ends and radiator. The aprons thus provided, substantially enclose the space between the frames and the front portion of the radiator above the axle. My invention contemplates securing a container or receptacle 1 to the lower edge of the depending apron and to the front edge of the projecting frame ends. To accomplish this, I have provided a radially curved plate 1, shown in Figs. 1 and 2 secured at 2, to the lower edge of the apron 3 mounted on the frame ends 4 of an automobile. The connection between the container plate 1 and apron 3 at the point 2, would preferably be a detachable connection consisting of a strap or plate of flexible spring material 20, rigidly secured at 21 to the apron 3 and having a pin 22 on its opposite end projecting through registering openings in the lower edge of the apron 3 and the flanged edge 2 of the curved pan 1. A spring locking finger of this character permits the edge of the curved pan 1 to be disconnected from the apron 3 either previous to removing the pan from the frame or for the purpose of permitting the crank handle to be rotated. At its opposite end, the plate 1 would be beaded or rolled over at 5 to form a rounded, hollow nosing, of which the interior diameter 6 would be sufficient to permit short tubes or pipes 23 to be inserted in the opposite ends of said rounded nosing. The width between frame ends varies on standard automobiles of the same type, so that where pans, such as my invention are placed between the ends they are generally narrower than the said space. To compensate for this difference, the tubes or pipes 23 would project from the opposite ends of the rounded nosing 5 and would be adjustable laterally within said nosing and set screws 24 mounted in the nosing to engage the tubes for positioning the same. The interior diameter of the tubes 23 would be such that the same could frictionally grip the external diameter of any nut, rod or bolt projecting laterally from the frame ends. It will be apparent that the container may be readily applied to the projecting frame end of an automobile or quickly and easily attached therefrom, should it be desirable to remove the device. In instances where the pan apron and adjacent parts of the machine would be highly varnished and finished it would be desirable to place a grating or similar medium within the pan and around the adjacent side walls thereof to prevent the baggage or other articles from contacting with and scratching the varnished surfaces.

Figure 5:
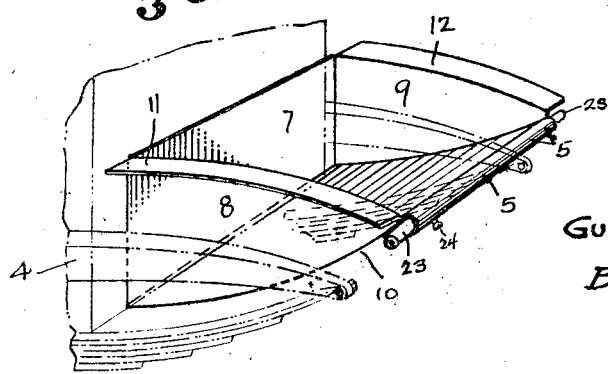
Fig. 5 represents a perspective elevation of a baggage receptacle about to be placed in position on the projecting frame ends of an automobile.

In those automobiles not provided with aprons between the frame ends and springs a receptacle, such as that shown in Fig. 5, might be utilized, the same consisting of a substantially vertical rear wall 7, side walls 8 and 9, spaced apart a distance substantially equal to the space between the frame ends and bottom plate 10. Side walls 8 and 9 are preferably flanged along the upper edge as at 11 and 12 respectively, so as to overlie the upper face of the projecting frame 14. The edge of the plate 10 would be rolled or curved at 5, so that the interior diameter thereof would fit the aforementioned projecting nut or bolt heads secured to the frame ends. Flanged edges 11 and 12 may be thus permanently or detachably secured to the said frame.

In automobiles of the Ford type not provided with frames, the ends of which do not project beyond the radiator, or rear portion of the body, I have provided a pair of spaced, hollow, curved members 14, designed to represent "goose neck" and which are adapted to be secured at 15 to the frame of said Ford automobile. A pan or container similar to that shown in Fig. 5 would be mounted between the extensory frame ends 14 and suitably secured thereto. It should be noted that the depth of the container or receptacle will vary according to particular styles and designs, and further so as to permit clear free movement of the crank handle 16. To unify the combination of container and extensory frame ends, I have provided flanges 17 on the said frames 14 to which a bumper 18 extending across the entire width of the machine may be secured. The combinative entirety of bumper, container and false frame ends may be thus quickly and readily applied to a Ford automobile with the result that an impression of longer wheel base or longer lines is given. In some instances, it might be desirable to provide only a combination of container and frame ends which would be solidly secured together in any desirable manner which would thus eliminate the necessity of the bumper connecting the frame ends.

Having thus described my invention what I claim and desire to secure by Letters Patent is:—

1. A baggage receptacle for automotive vehicles comprising a curved pan having a rolled front edge to detachably engage the frame ends of a vehicle and a flanged rear edge to engage an adjacent portion of said vehicle.

2. A baggage receptacle for automotive vehicles comprising a curved pan having a rolled front edge; means in said rolled front edge to engage the frame ends of an automotive vehicle; and a flange on the opposite edge of said curved pan to engage an adjacent portion of said vehicle.

3. A baggage receptacle for automotive vehicles comprising a curved pan having a rolled front edge and a vertically flanged rear edge; and side flanges connecting the pan and rear edge adapted to engage the frame ends of an automotive vehicle.

In testimony whereof, I have hereunto set my hand at San Francisco, California, this 21st day of October, 1921.

GUSTAVE O. HEINE.

In presence of—
LINCOLN V. JOHNSON.